July 16, 1940.  R. W. BROWN  2,208,539
FLUID PRESSURE VALVE CONTROL
Filed Nov. 23, 1937
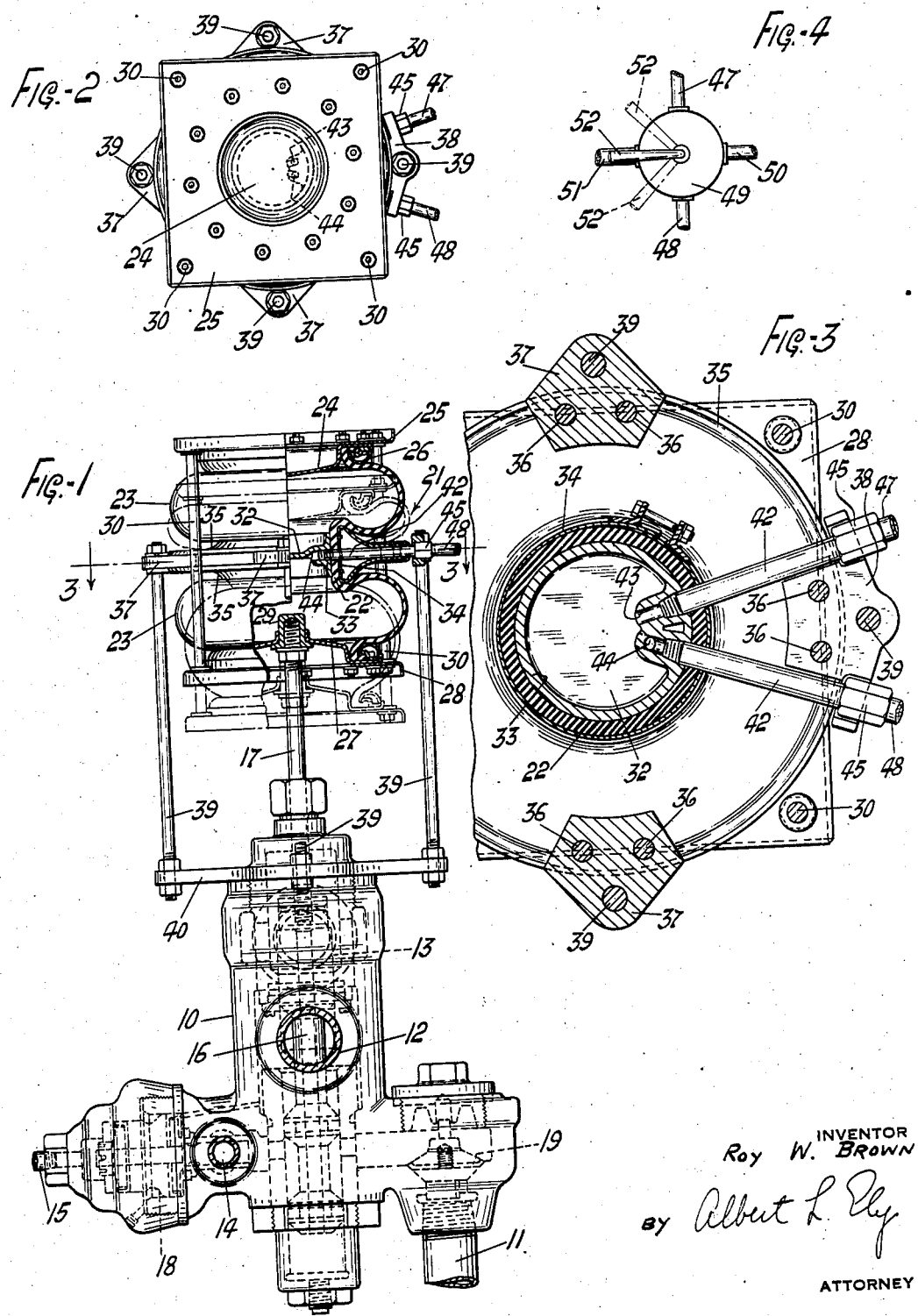
INVENTOR
Roy W. Brown
BY Albert L. Ely
ATTORNEY Patented July 16, 1940

2,208,539

UNITED STATES PATENT OFFICE 2,208,539

FLUID PRESSURE VALVE CONTROL

Roy W. Brown, Akron, Ohio, assignor to The Firestone Tire & Rubber Company, Akron, Ohio, a corporation of Ohio Application November 23, 1937, Serial No. 176,072

2 Claims. (Cl. 137—156.5)

This invention relates to fluid pressure operated devices for effecting or controlling the operation of other mechanisms, such as hydraulic valves and the like. The invention is an improvement upon fluid pressure operated cylinders, and diaphragm devices, heretofore commonly used for the same purpose.

The chief objects of the invention are to avoid leakage of fluid and to reduce maintenance costs such as obtain when fluid pressure operated cylinders are used; and to obtain greater amplitude of movement than is possible to obtain with diaphragm devices. Other objects will be manifest as the specification proceeds.

Of the accompanying drawing:

Figure 1 is a side elevation of control apparatus embodying the invention, in its preferred form, parts being broken away and in section;

Figure 2 is a plan view thereof;

Figure 3 is a section, on a larger scale, on the line 3—3 of Figure 1; and

Figure 4 is a plan view of a manually operated valve for directing the flow of fluid to the improved control apparatus.

Referring to the drawing, the improved control apparatus is shown in operative association with a hydraulic valve of known construction, which valve per se is not a part of the present invention so that but a brief description thereof will suffice. Said hydraulic valve comprises a housing 10 to which is connected a low pressure fluid inlet pipe 11, a low pressure outlet pipe 12 extending to hydraulically operated apparatus, such as a press (not shown), a drain connection, shown in broken lines at 13, a high pressure fluid inlet 14, and a low pressure fluid pipe 15 having connection (not shown) with the low pressure pipe 11. Interiorly of the housing 10 is a valve mechanism 16 that operates by vertical movement therein, such movement of the valve mechanism being effected by means of an operating stem 17 that extends vertically from the top of the housing, and has its upper end connected to the improved control device constituting the subject matter of this invention.

The valve mechanism 16 has three operative positions, namely, the intermediate position shown, a position depressed with relation to the intermediate position, and a position that is elevated with relation thereto. In the depressed position of the valve mechanism 16, low pressure fluid from pipe 11 flows through the valve structure and through outlet pipe 12 to the apparatus, such as a press, that is operated by the hydraulic valve, to close said press. As soon as the press is closed, the pressure builds up and provides a back pressure sufficient to overcome the low pressure of pipe 15, and thereby to open a piston valve 18 that permits high pressure fluid from inlet 14 to flow to the press. An automatic valve 19 prevents the high pressure fluid from entering pipe 11. In the elevated position of valve mechanism 16 fluid from pipes 11 and 14 is shut off and outlet 12 is opened to permit the fluid to drain from the press and thereby to open the same. In the intermediate position of the valve mechanism, pressure fluid from pipes 11 and 14 is shut off and the outlet 12 is closed. The intermediate position of the valve mechanism permits the operation of the press to be suspended temporarily during either the closing or the opening thereof.

The improved control device that is connected to the upper end of stem 17, for operating valve mechanism 16, consists essentially of a bellows, generally designated 21, which bellows is a hollow structure with flexible walls, preferably of reinforced rubber, and having a constricted cylindrical medial portion 22 opening into generally torus shaped end portions 23, 23 of larger diameter. The bellows 21 is disposed on a vertical axis, and has its upper end closed by a cup-shaped closure member 24 that fits within the upper end thereof, said closure-member being peripherally secured to a square top plate 25. The under side of the latter is provided with an annular clamping element 26 that engages a bead structure formed integrally with the end of the bellows, the arrangement being such that the end plate and bellows are secured to each other with a fluid-tight connection. In like manner the lower end of the bellows is provided with a cup-shaped closure member 27, and a square bottom plate 28, the upper end of the stem 17 extending through a central aperture in the bottom plate 28 and being threaded into an axial socket 29 carried by said closure member 27. A plurality of tie rods 30, 30 positioned at the respective corners of the top plate 25 and bottom plate 28 secure said plates to each other in fixed spaced relation, with the bellows 21 therebetween.

Mounted interiorly of the bellows 21, in the medial region of the cylindrical constricted portion 22, is a disc-like partition 32 that is formed with a marginal flange 33 engaging the inner wall of said cylindrical portion 22. To provide a fluid-tight seal between the flange 33 and the bellows wall, a suitable clamp 34 is mounted exteriorly of said wall and tightly drawn thereabout. In continuation of the lateral margins of the clamp 34 are respective, annular girdle rings 35, 35. In section said rings are reversely curved, and at their inner peripheries they fit into the arcuate, concave juncture of cylindrical medial portion 22 of the bellows and the bulbous portions 23 thereof. Radially outwardly of their inner peripheries the curve of the girdle rings brings them relatively close to each other, there being four symmetrically positioned spacer members mounted between the respective girdle rings and to which said rings are secured, as by rivets 36, 36, Figure 3. Three of said spacer members, designated 37, 37, are solid, the fourth spacer member, designated 38, being divided in its own plane. The spacer members 37, 38 are mounted upon the upper ends of respective posts 39 that rise from a supporting bracket 40, the latter being mounted upon the housing 10 of the hydraulic valve, near the upper end thereof. The arrangement is such that the stem 17 is moved axially up or down by the inflation and consequent axial elongation of the respective upper or lower bellows portion 23, one of said portions being deflated as the other is inflated, the medial cylindrical portion of the bellows at all times being stationary.

For inflating the respective bulbous portions 23 of the bellows, a pair of pressure fluid conduits or pipes 42, 42 extend radially through suitable apertures formed in the clamp 34 and in the cylindrical portion 22 of the bellows, and have their end portions threaded into respective ports 43, 44 formed in the partition member 32. The port 43 communicates with the interior of the upper bellows portion 23, and the port 44 communicates with the lower bellows portion 23, as is most clearly shown in Figure 3. The outer ends of pipes 42 carry respective coupling nuts 45 that are received in suitable recesses formed in the respective parts of the divided spacer member 38.

Coupled to the pipes 42 are respective fluid supply pipes 47, 48, which pipes are connected to a four-way operating valve 49, Figure 4, the latter being connected to a main fluid supply pipe 50 that communicates with a source of fluid pressure (not shown). The valve 49 also is provided with an exhaust pipe 51, and with an operating handle 52. The valve 49 is so arranged interiorly that when the handle 52 is in the lower broken line position shown, the lower bellows portion will be inflated with fluid passing thereto through the pipe 48, the upper bellows portion being concurrently vented to the atmosphere through pipe 47 and exhaust pipe 51. When the handle 52 is in the upper broken line position shown, the upper bellows portion will be inflated and the lower bellows portion vented. When the handle 52 is in the intermediate, full line position shown, fluid from the supply pipe 50 will be shut off and both ends of the bellows will be vented to the atmosphere through a suitable bleeder duct.

When fluid under pressure is admitted to the bellows, for example, to the lower end thereof, the lower bulbous portion 23 of the bellows expands and elongates axially, thus moving the lower end plate 28 and lower closure member 27 downwardly to effect a downward movement of the valve stem 17. Since the upper end plate 25 is connected to the bottom plate 28 by tie rods 30, movement of the bottom plate will produce a similar movement of the upper plate 25 and thereby effect a collapsing and deflating of the upper bellows portion 23, as is clearly indicated in broken lines in Figure 1. The movements described are reversed when fluid is admitted to the upper bellows portion and evacuated from the lower bellows portion, the upper end plate 25 being thereby lifted upwardly so as to raise lower end plate 28 and lower closure 27, the stem 17 being drawn upwardly with the latter. The extent of axial movement by the bellows portions 23 is limited by the valve member 16 attached to the stem 17. When it is desired to leave the valve 16 and bellows structure in the intermediate position shown in full lines in Figure 1, the handle 52 will be thrown to the proper broken line position to admit fluid to the deflated end of the bellows. As soon as this end of the bellows is inflated to the same size as the opposite end, and the end plates 25, 28 are midway between their extreme upper and lower limits of travel, the operator turns the handle to the intermediate full line position shown, with the result that further movement of the end plates ceases, and both chambers of the bellows are vented to the atmosphere through the bleeder duct of the valve 49.

The use of a bellows in a valve control makes it possible to operate a greater number of valve structures than otherwise would be possible. Furthermore, there is less fluid leakage and less maintenance expense than in piston type valve-operating devices. By admitting fluid to the bellows in the fixedly mounted medial region thereof, the use of flexible fluid conductor pipes is obviated.

Modification may be resorted to without departing from the spirit of the invention, or the scope thereof as defined by the appended claims.

What is claimed is:

1. A fluid retaining device for use as a fluid operated servo-motor comprising a deformable, unitary, generally tubular, flexible reinforced rubber casing normally having annular cross-sections throughout, and having a restricted, intermediate, radially inextensible portion of substantial length and arcuate bulbous portions extending axially on either side of said restricted intermediate portion, said bulbous portions terminating in circumferentially inextensible ends having diameters less than the normal outside diameter of the said bulbous portions, and plates closing the ends of said casing, means connected to said end plates and extending from the region contiguous with said ends having surfaces convexed toward the convex portion of said casing and so constructed and arranged to engage said convex portions during axial compression of said casing, whereby flexing of the wall of said casing contiguous to the point of attachment to casing and end plates is prevented and whereby the length of the convexed portion which is free to flex under the influence of the internal fluid pressure is progressively reduced and the curvature of the casing wall is gradually and progressively changed from convex transversely to convex axially of said casing, a girdle ring surrounding the intermediate portion of said casing having a cylindrical surface engaging said cylindrical intermediate portion of said casing and integral reversely curved surfaces transversely of the axis of said casing and concave toward the adjacent bulbous portions, the relative length of said intermediate portion of the axial extent of said convexing portions being such that upon compression of said casing the convex bulbous portions axially overlap said restricted portion progressively from the ends thereof, means for rigidly connecting said end plates together so that they form parts of a rigid unit, and means for operatively associating said rigid unit and said intermediate portion of said casing with members which are to be operated by the servo-motor, means dividing the interior of said casing into individual opposed chambers, and means for alternately introducing a fluid into the separate chambers.

2. A fluid retaining device for use as a fluid operated servo-motor comprising a deformable, unitary, generally tubular, flexible reinforced rubber casing normally having annular cross-sections throughout, and having a restricted, intermediate, radially inextensible portion of substantial length and arcuate bulbous portions, extending axially on either side of said restricted intermediate portion, said bulbous portions terminating in circumferentially inextensible ends, plates closing the ends of said casing, means connected to said end plates and extending from the region contiguous with said ends having surfaces convexed toward the convex portion of said casing and so constructed and arranged to engage said convex portions during axial compression of said casing, whereby flexing of the wall of said casing contiguous to the point of attachment to said end plates is prevented and whereby the length of the convexed portion which is free to flex under the influence of the internal fluid pressure is progressively reduced and the curvature of the casing wall is gradually and progressively changed from convex transversely to convex axially of said casing, a girdle ring surrounding the intermediate portion of said casing having a cylindrical surface engaging said cylindrical intermediate portion of said casing and integral reversely curved surfaces transversely of the axis of said casing and concave toward the adjacent bulbous portions, the relative length of said intermediate portion of the axial extent of said convexing portions being such that upon compression of said casing the convex bulbous portions axially overlap said restricted portion progressively from the ends thereof, means for rigidly connecting said end plates together so that they form parts of a rigid unit, and means for operatively associating said rigid unit and said intermediate portion of said casing with members which are to be operated by the servo-motor, means dividing the interior of said casing into individual opposed chambers, and means for alternately introducing a fluid into the separate chambers.

ROY W. BROWN.